Feb. 11, 1958 R. R. FREAS, JR., ET AL 2,823,307

COINCIDENCE CIRCUIT

Filed Nov. 6, 1953 2 Sheets-Sheet 1

INVENTORS.
JENNESS P. EUGLEY
ROBERT R. FREAS, JR.
BY James S. Shannon
AGENT.
and
Wade Koontz
ATTORNEY Feb. 11, 1958 R. R. FREAS, JR., ET AL 2,823,307

COINCIDENCE CIRCUIT

Filed Nov. 6, 1953 2 Sheets-Sheet 2

INVENTORS.
JENNESS P. EUGLEY
ROBERT R. FREAS, JR.
BY James S. Shannon
AGENT
Wade Koontz and
ATTORNEY.

United States Patent Office 2,823,307

Patented Feb. 11, 1958

2,823,307

COINCIDENCE CIRCUIT

Robert R. Freas, Jr., Collingswood, and Jenness P. Eugley, Runnemede, N. J., assignors to the United States of America as represented by the Secretary of the Air Force Application November 6, 1953, Serial No. 390,769

6 Claims. (Cl. 250—27)

The object of this invention is to provide a coincidence or gating circuit for selecting or suppressing from a pulse wave a pulse or pulses adjacent in time to either the rising or falling edge of a square wave of much longer period than the pulse wave. It is a further object of the invention to provide a coincidence circuit for accomplishing the above that is simpler than circuits heretofore used in that no separate gate generator is required.

The circuits consists essentially of a biased electron tube to the grid of which are applied the pulse wave and a series of comparatively long gate pulses of alternate polarity derived from the edges of the square wave by successive passages through low and high pass filters. In the case of pulse selection at the positive-going edge of the square wave, the pulse wave polarity is made negative and the tube is biased at or beyond cut-off so that an output is produced only during those of the gate pulses that are positive. One or more pulses appear in the tube output during this period depending upon the length of the gate pulses, which is determined by the constants of the low and high pass filters. Grid clipping is employed to limit the gate pulses and permit their removal from the output signal by differentiation. For selection at the negative going edge, the tube bias is made positive by a sufficient amount for grid clipping to suppress all pulses except the pulse or pulses occurring during the negative gate pulse. For suppression at the negative-going edge of the square wave, the bias is adjusted to a value between the cathode potential and anode current cut-off such that grid clipping of the positive gate occurs and the negative gate travels beyond anode cut-off. With the same bias adjustment but with a positive pulse wave applied, suppression at the positive-going edge can be achieved.

The invention will be explained more fully in connection with the specific embodiment thereof shown in the drawings, in which Fig. 1 is a schematic diagram of an embodiment of the invention in which pulse selection at the positive-going edge of the square wave occurs;

Fig. 1*a* shows a modification of Fig. 1 using positive bias for selection at the negative going edge of the square wave;

Figure 1:
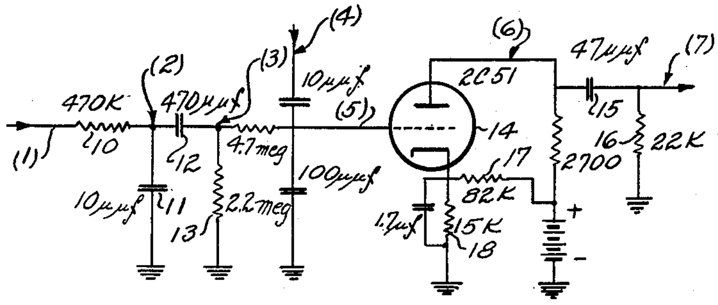
Figure 2:
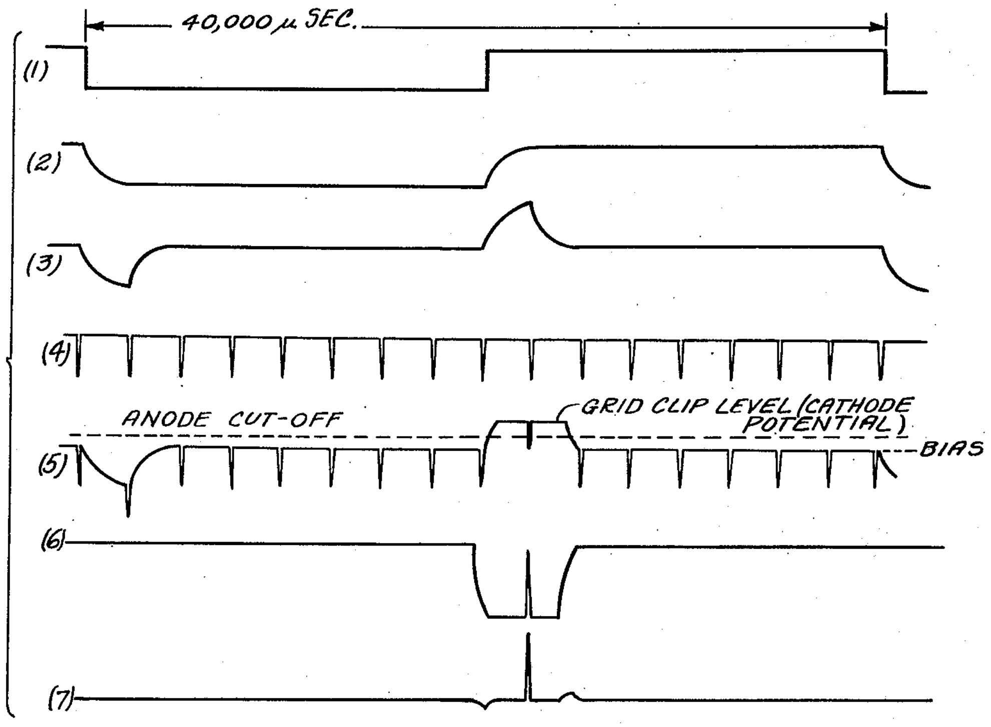
Fig. 2 shows waveforms occurring in the circuit of Fig. 1.

Figure 1 shows an embodiment of the invention which produces an output pulse adjacent to the positive-going edge of the square wave. Referring to the figure and to Fig. 2, the square wave (1) is first passed through low pass filter 10—11 which produces the waveform (2). This waveform is then passed through high pass filter 12—13 which produces the waveform shown at (3). Waveform (3) and negative pulse series (4) are applied to the grid of tube 14. This tube is biased slightly beyond cut-off, by potential divider 17—18, so that anode current flows only during the positive pulses of wave (3) as shown in waveform (5). As also seen in waveform (5) the positive pulses of wave (3) are clipped at the point where the grid potential equals the cathode potential or slightly above and are thus flattened. The amplified and inverted output of tube 14 is shown at (6) in Fig. 2. In passing through differentiating circuit 15—16, which substantially removes the negative pedestal, wave (6) is converted into output wave (7). In the example shown only one pulse is selected. More than one pulse may be selected by changing the constants of filters 10—11 and 12—13 to broaden the pulses of wave (3).

Figure 1A:
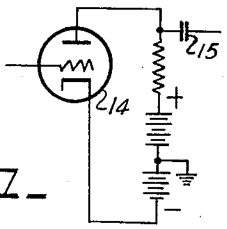
Figure 3:
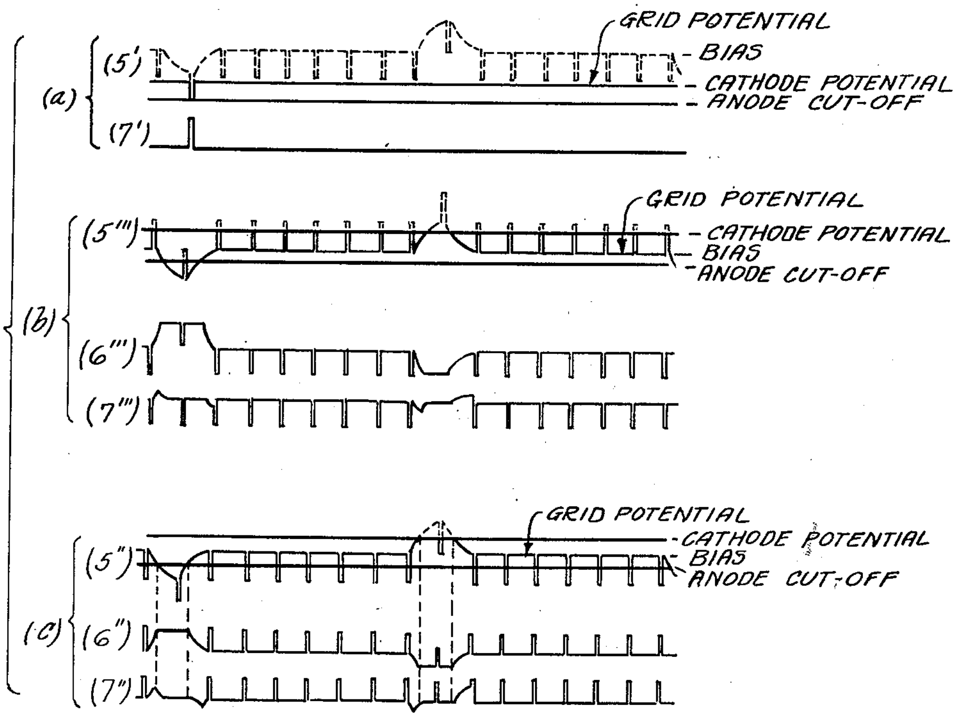
Fig. 3 illustrates other modes of operation of Fig. 1 and Fig. 1*a*.

Other modes of operation of the circuit are possible. By adjusting the bias to the value illustrated in Fig. 3(*a*) selection at the negative-going edge of the square wave can be accomplished. As seen in Fig. 3(*a*) the bias is positive relative to the cathode by an amount greater than the amplitude of the negative pulse signal but less than the combined amplitude of pulse signal and negative pedestal. Therefore the negative pulses alone or combined with the positive pedestals are not able to cancel the positive bias and lower the grid below cathode potential. Consequently, for this type signal, grid conduction and the grid circuit resistance hold the grid at substantially cathode potential. However, when a negative pulse is coincident with a negative pedestal, the combined negative voltage is sufficient to overcome the positive bias and drive the grid negative relative to the cathode. This results in a reduction of anode current and a rise in anode voltage as shown at 7′ in Fig. 3(*a*). A conventional method of obtaining the positive bias is shown in Fig. 1*a*. The circuit may also be adjusted to pass all pulses except the pulse or pulses adjacent to the positive-going or negative-going edges of the square wave.

Fig. 3(*c*) shows the proper bias adjustment for suppression at the negative-going edges. In this arrangement the bias is negative relative to the cathode and has a value that differs from the anode current cut-off valve by an amount that is somewhat less than the negative pedestal amplitude. Therefore, the pulse coincident with the negative pedestal occurs entirely beyond anode cut-off and is removed as shown at 5″ and 6″. The waveform at 7″ results from the action of differentiating circuit 15—16 on the waveform 6″.

A similar bias adjustment is used for suppression at the positive-going edges but in this case a positive rather than a negative pulse series is used, as shown in Fig. 3(*b*). For this operation the bias is adjusted to be negative relative to the cathode by an amount somewhat less than the amplitude of a positive pedestal. This results in removal by grid clipping of pulses coincident with positive pedestals as shown at 5‴ and 6‴. Waveform 7‴ results from the action of differentiating circuit 15—16 on waveform 6‴.

We claim:

1. A coincidence circuit comprising an electron tube having a grid, an anode and a cathode, a filter network comprising a low-pass filter section and a high pass filter section connected in cascade, means for applying a comparatively low frequency square wave to the input of said filter network, said low-pass filter section being designed to block the high frequency components of said square wave and said high-pass filter section being designed to block the low frequency components of said square wave whereby the output of said filter is a series of alternately positive and negative pedestals occurring at the positive-going and negative-going edges, respectively, of said square wave, means for applying the output of said filter network to the grid-cathode circuit of said tube, means for applying a comparatively high frequency pulse wave to the grid-cathode circuit of said tube, means for applying a fixed bias to said grid, an output circuit, and a differentiating circuit connected between the anode-cathode circuit of said tube and said output circuit.

2. Apparatus as claimed in claim 1 in which said comparatively high frequency pulses are negative and in which said grid is biased slightly beyond anode cut-off whereby an output occurs only near the positive-going edges of said square wave.

3. Apparatus as claimed in claim 1 in which said comparatively high frequency pulses are negative and said grid is biased positive relative to said cathode by an amount exceeding the amplitudes of said pulses and the output voltage of said filter network individually but less than the sum of these amplitudes, whereby an output is produced only near the negative-going edges of said square wave.

4. Apparatus as claimed in claim 1 in which said comparatively high frequency pulses are negative and said grid is biased at a point between the cathode potential and anode cut-off such that grid clipping occurs during periods including the positive-going edges of said square wave and anode cut-off occurs during periods including the negative-going edges of said square wave, whereby an output is produced at all times except near the negative-going edges of said square wave.

5. Apparatus as claimed in claim 1 in which said comparatively high frequency pulses are positive and said grid is biased at a point between the cathode potential and anode cut-off such that grid clipping occurs during periods including the positive-going edges of said square wave and anode cut-off occurs during periods including the negative-going edges of said square wave, whereby an output is produced at all times except near the positive-going edges of said square wave.

6. A coincidence circuit comprising an electron tube having a grid, an anode and a cathode, a filter network comprising a simple low-pass R–C section and a simple high-pass R–C section connected in cascade, means for applying a comparatively low frequency square wave to the input of said filter network, the time constants of said R–C sections being much less than the half-period of said square wave, means for applying the output of said filter network to the grid-cathode circuit of said tube, means for applying a comparatively high frequency pulse wave to the grid-cathode circuit of said tube, means for applying a fixed bias to said grid, an output circuit, and a differentiating circuit connected between the anode-cathode circuit of said tube and said output circuit.

References Cited in the file of this patent

UNITED STATES PATENTS

| | | |
|---|---|---|
| 2,237,661 | Ernst | Apr. 8, 1941 |
| 2,379,739 | Norton | July 3, 1945 |
| 2,403,616 | Sanders | July 9, 1946 |
| 2,408,078 | Labin et al. | Sept. 24, 1946 |
| 2,542,152 | McConnell | Feb. 20, 1951 |